United States Patent Office 2,981,527
Patented Apr. 25, 1961

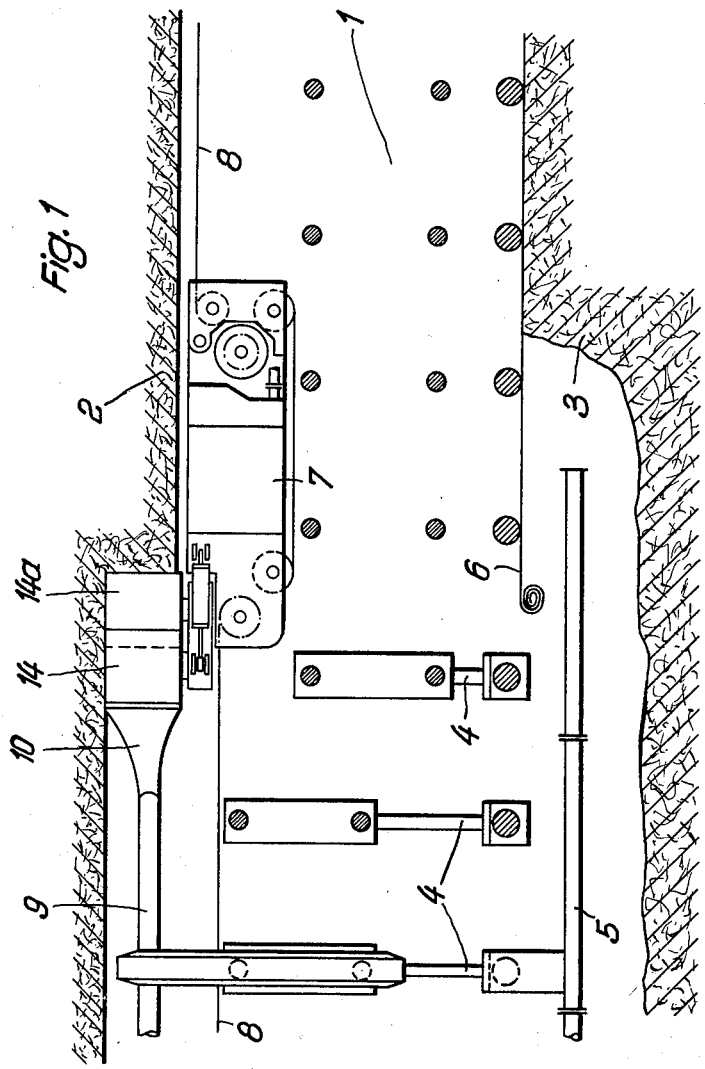

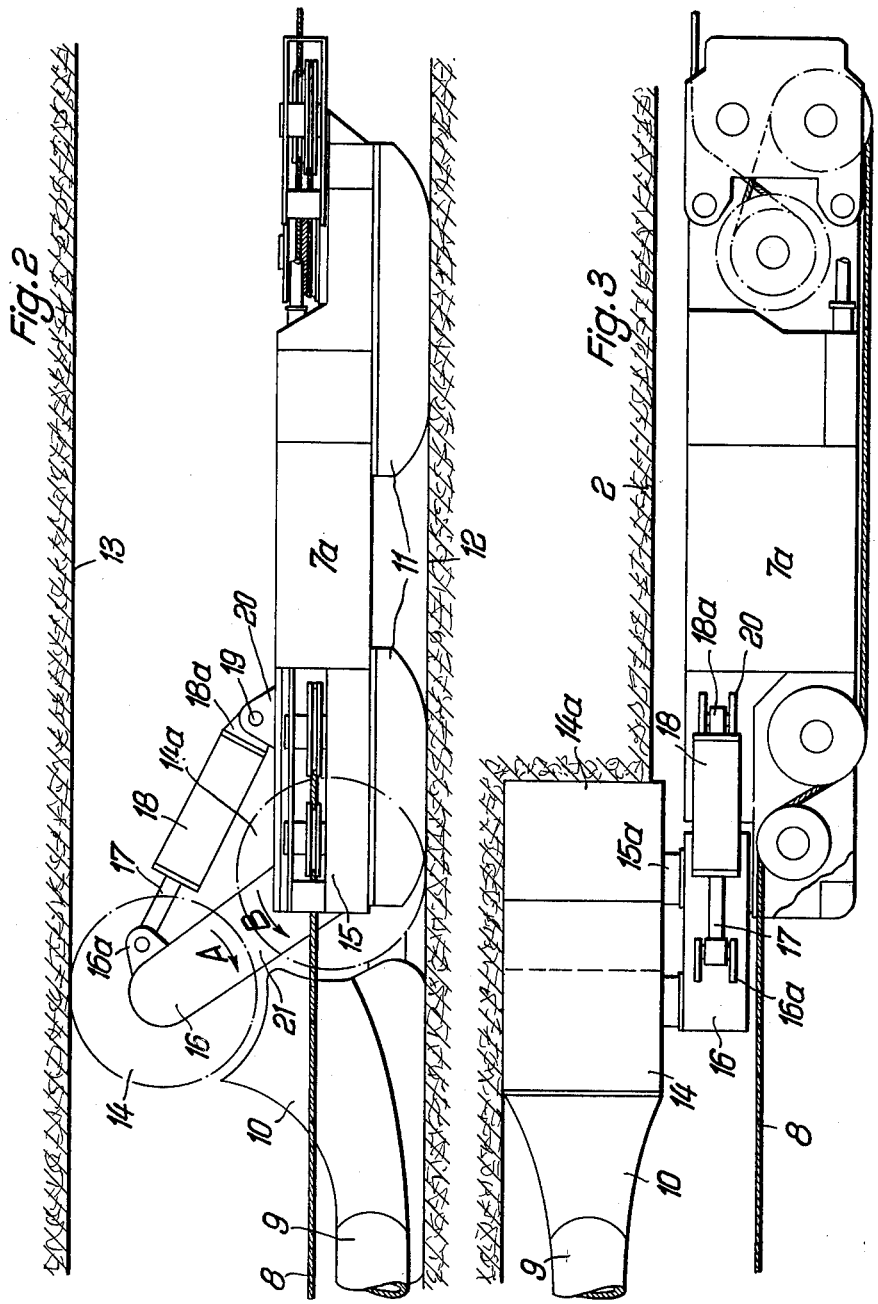

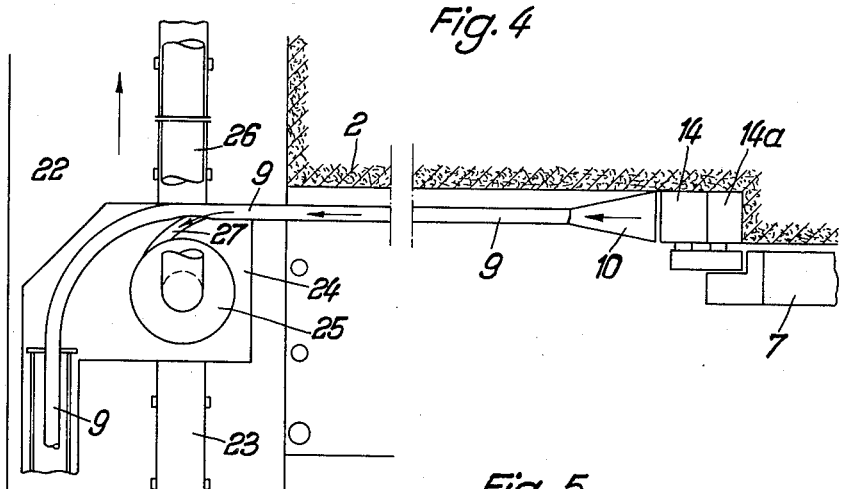
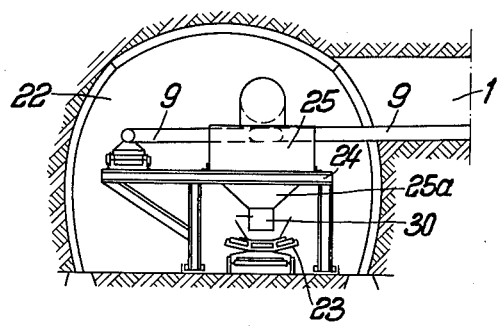
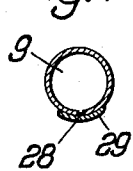
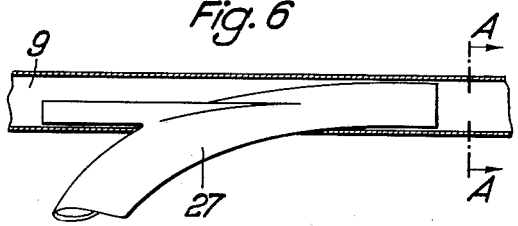

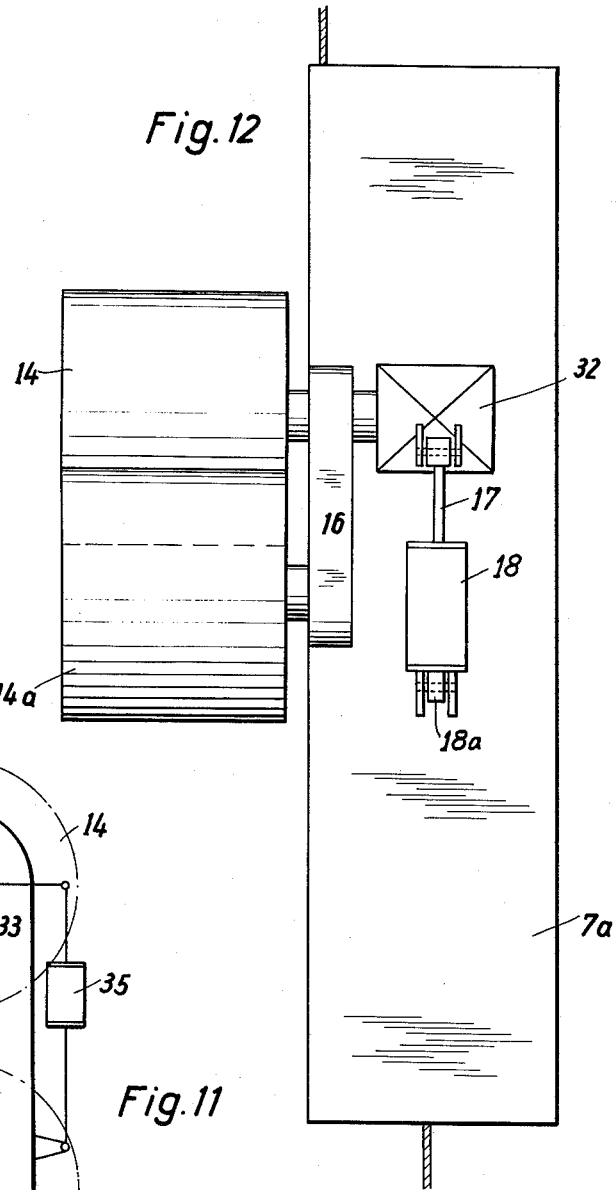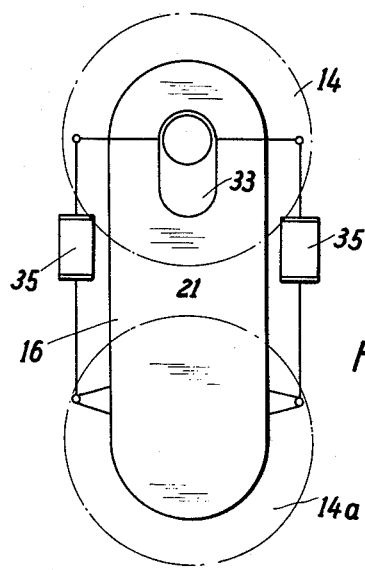

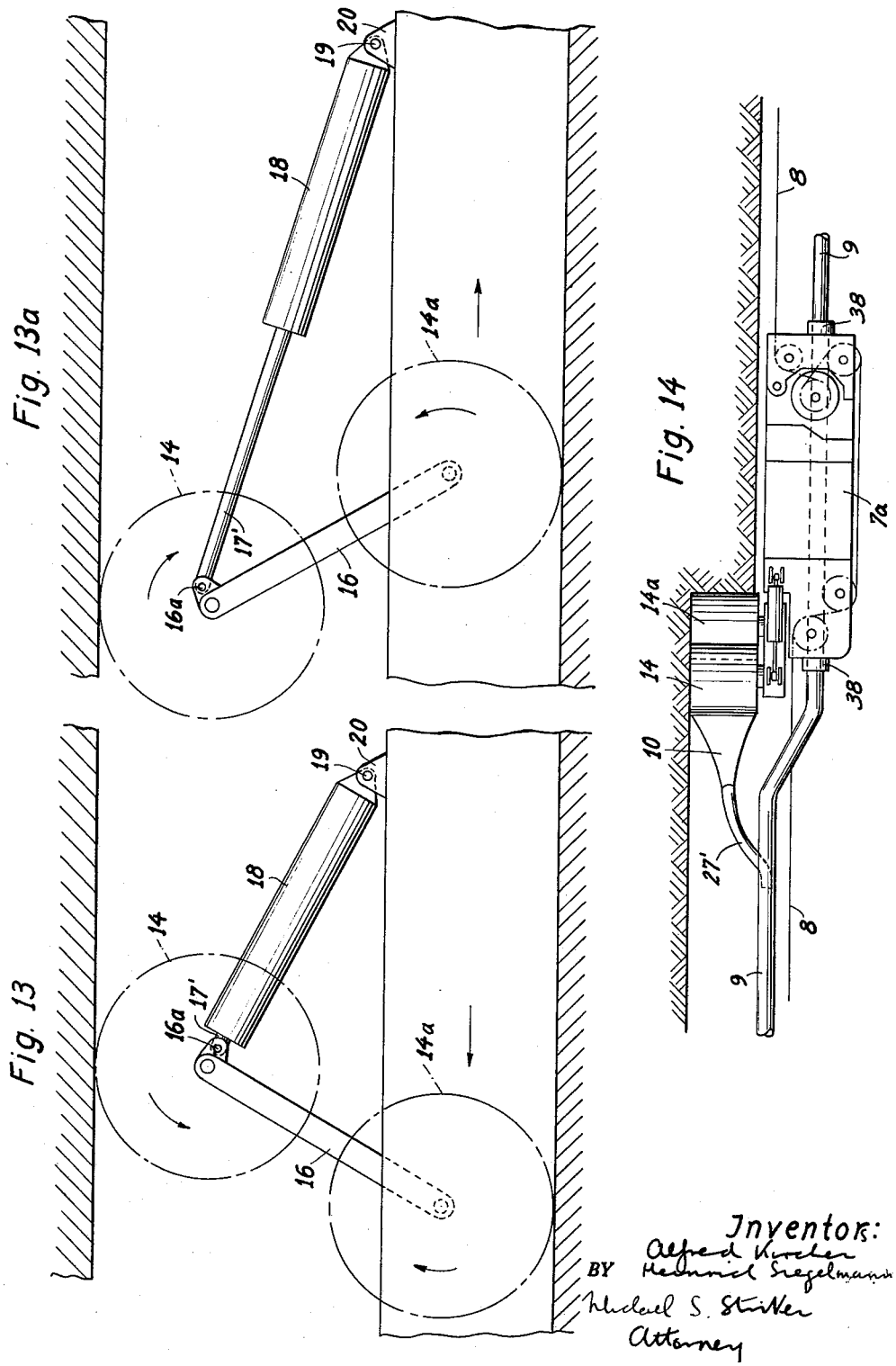

2,981,527

MINING MACHINE HAVING CUTTING AND BREAKING ROLLS AND SUCTION TRANSPORTING MEANS

Alfred Kircher and Heinrich Siegelmann, Gelsenkirchen, Germany, assignors to Gelsenkirchener, Bergwerks-A.G., Essen, Germany Filed Oct. 21, 1958, Ser. No. 768,809

Claims priority, application Germany Oct. 21, 1957

6 Claims. (Cl. 262—27)

Machines are known with which the mechanical mining of coal or the like can be performed. Such machines have usually a plurality of cutting knives which are mounted on adjustable arms on the machine body so that they can be applied against the seam of the coal or the like to be mined.

Machines are also known which will not only cut the coal or the like from the seam, but which will also load the cut coal onto a transporting conveyor.

The use of such mechanized cutting and loading machines requires the use of conveying means which can be moved forward together with the cutting and loading machine into the front of the mine tunnel at which the actual mining is performed. It should be noted that this front end of the tunnel is only provisionally propped during the mining operation and the use of known mechanical cutting and loading machines is therefore usually restricted to the mining of such seams which are surrounded by more or less solid rock which will not cave in during the mining operation.

Furthermore the cutting and loading machines of the prior art by which big lumps of coal or the like are cut from the seam and loaded on a conveyor, require considerable space, which in turn will make the provision of a relative wide tunnel necessary. In addition the necessary continuous forward movement of the front end of the conveyor of the usual type becomes rather difficult in the limited space available.

The present invention relates to a mining machine for coal or the like which performs cutting and loading of the mineral to be mined and it is an object of the present invention to provide for such a machine which avoids the difficulties of known machines of this type.

It is a further object of the present invention to provide for a mining machine which will not only cut the mineral to be mined from the seam, but which will also crush the mineral after it is cut loose from the seam to such a size so that it can be easily transported within the narrow space available.

It is an additional object of the present invention to provide for transporting means which will require a minimum of space and which are adapted to continuously receive the broken minerals from the mining machine as the same advances during the mining operation.

It is yet a further object of the present invention to provide for such a mining machine which is constructed of relatively few and ruggedly constructed parts so that the machine will operate trouble free during extended periods.

With these objects in view the mining machine of the present invention includes support means in the form of an elongated carriage, moving means for moving this support means towards the face to be mined and away therefrom, a pair of cutting rolls mounted on the support means turnably about substantially parallel axis spaced from each other a distance greater than the sum of the radii of the rolls so that a gap is formed between the rolls. The cutting rolls being adapted to engage opposite faces of the seam to be mined, while the support means are moved forwardly into the seam so as to cut the mineral to be mined from the seam during the turning of the rolls and the mineral lumps detached will be passed through the gap between the rolls so as to be broken into pieces of a maximum size according to the width of the gap between the rolls. The machine includes also means for turning the rolls in opposite direction and preferably in such a manner that the portions of the rolls facing each other move in a direction opposite to the direction in which the moving means moves the support means or the carriage. The machine includes also receiving means mounted on the support means adjacent the gap between the rolls for receiving the broken mineral or coal pieces, and transporting means associated with the receiving means for transporting the broken coal away from the mining machine.

Preferably the upper of the two rolls is mounted adjacent the upper end of an arm, which in turn is mounted adjacent the lower end thereof on the support means tiltable about the axis of the lower roll. In this case the machine includes also means operatively connected to the support means and to the upper end of the arm for changing the inclination of the arm relative to the support means so that the vertical distance between the outermost portions of the rolls may be adjusted without changing the gap between the rolls. Preferably the two rolls are mounted for turning movement about parallel and horizontal axis and in such a way that they extend laterally from the support means.

The transporting means are preferably in the form of a suction conduit and the receiving means in form of a funnel located at the discharge end of the gap between the rolls to receive the crushed coal or mineral pieces as they are ejected through the gap. The suction conduit may be connected to the funnel so that the suction conduit advances with the machine as the same is driven into the seam. The suction conduit may also be laid alongside the path the machine advances during the mining operation, and in this case special provisions have to be made in the suction conduit and on the funnel to continuously transfer the crushed mineral pieces into the suction conduit as the machine advances during the mining operation.

The machine of the present invention permits the transportation of the crushed coal or the like by suction through conduits which require considerable less space then the transporting conveyors previously used so that the width of the tunnel to be driven forwardly can be held considerably smaller. The pair of rollers provided will simultaneously cut the roof and the floor of the seam to be mined to provide substantially flat faces, which will greatly facilitate the operation of the machine and the mounting of the necessary supporting props.

The breaking of the coal into small pieces in one operation with the cutting of the coal from the seam facilitates not only the transporting of the coal pieces in the limited space available in the mine, but this breaking operation will also transform the coal lumps into a commercially desirable size.

Furthermore by transporting the coal through suction action away from the cutting and crushing rolls the development of dangerous coal dust during the mining operation is prevented. This makes the commonly used wetting of the crushed coal unnecessary, which in turn facilitates the further processing of the coal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a sectional plan view showing in a schematic manner the overall arrangement of the machine in a mine;

Fig. 2 is a schematic side view of the machine of the present invention;

Fig. 3 is a schematic top view of the machine as shown in Fig. 2;

Fig. 4 is a schematic top view of the general arrangement of the transporting means connected to the machine of the present invention;

Fig. 5 is a side view of part of the transporting system;

Fig. 6 is a sectional view of a detail of the transporting means;

Fig. 7 is a section taken along line A—A of Fig. 6 and viewed in the direction of the arrows;

Fig. 11 is a schematic side view of part of the machine showing schematical means for adjusting the position of the upper roll;

Fig. 12 is a schematic top view of a modification of the machine;

Fig. 13 is a schematic partial side view of the machine shown in Fig. 12 and showing the upper roll in one adjusted angular position;

Fig. 13a is a schematic partial side view showing the upper roll in another adjusted position; and Fig. 14 is a view similar to Fig. 1 and showing a modification of the machine arrangement.

Figure 8:
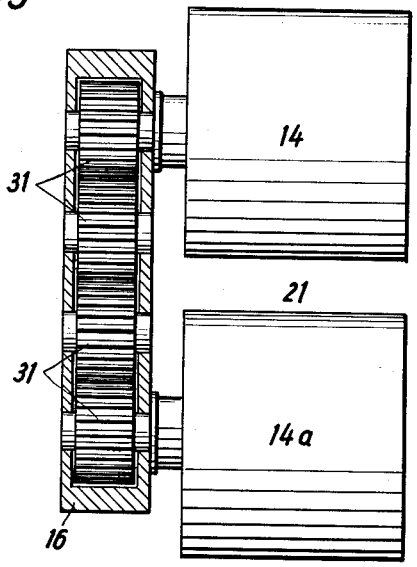
Figs. 8 and 8a are respectively a schematic partially sectioned front view and a side view of a portion of the machine showing the rolls thereof in one of the adjusted positions.
Figure 8A:
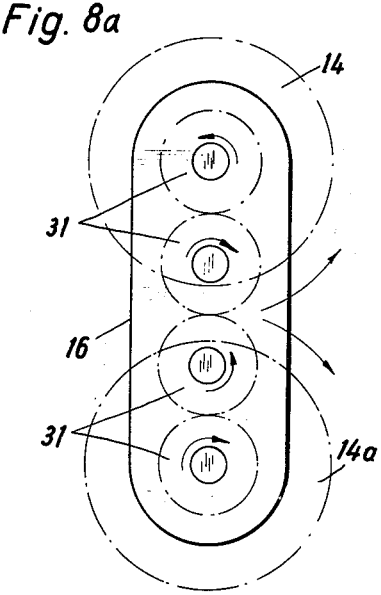

Referring now to the drawings and more particularly to Fig. 1 of the same, it will be seen that the mining machine 7 of the present invention is arranged in a tunnel 1 the forward portion of which is supported by temporary props, schematically indicated by the small circles in Fig. 1, and the mining machine 7 is adapted to mine the seam 2 schematically indicated on the left side, as viewed in Fig. 1 of the machine 7. The roof of the already fully mined part of the tunnel 1 is supported by prop frames 4 of any well known construction. The already fully mined part of the tunnel not necessary for free movement of the machine 7 and the operators thereof is being filled with loose rock 3, seen at the right side of the tunnel as viewed in Fig. 1, which rocks are preferably transported by compressed air through the conduit 5. A wire mesh 6 is provided properly supported on the props to provide a limiting wall for the rock pieces blown in through the conduit 5.

The mining machine 7 schematically shown in Fig. 1 is shown in further details in Figs. 2 and 3. The machine comprises support means or an elongated carriage 7a on which the mining tools and the means for operating the machines are mounted. The elongated support 7a may be mounted on slides 11 which rest on the floor 12 of the seam to be mined. In the embodiment illustrated the mining machine 7 is transported by means of a cable 8, preferably anchored on both ends thereof and guided over cable drums driven by a motor, not shown in the drawing, to move the machine 7 in either direction according to the direction of rotation of the cable drums. Of course, different means may also be provided to transport the machine body 7a. A separate winch may be provided in front of the machine anchored to the floor of the tunnel and connected by a cable to the front end of the machine to pull the machine forwardly, or the machine may be provided with endless tracks, instead of the slides 11, and a motor for driving the tracks.

A pair of cutting rolls 14 and 14a are mounted on the machine extending laterally from the machine frame 7a, as can be clearly seen in Fig. 3. The cutting rolls are only schematically indicated in the drawings, but it is understood that these rolls are provided on the periphery thereof with proper cutting teeth or cutting surfaces which are adapted to cut, during rotation of the rolls, the coal or the mineral to be mined from the seam. The upper roll 14 which engages the roof 13 of the seam to be mined is mounted tiltable about the turning axis 15 of the lower roll 14a. The tilting arm 16 which carries the upper roll 14 is journalled adjacent the lower end thereof on the shaft 15a of the lower roll 14 and this tilting arm carries adjacent its upper end a forked projection 16a to which the piston rod 17 of the tilting cylinder 18 is pivotally connected. A connecting piece 18a at the bottom of the cylinder 18 is pivotally connected by means of a bolt to the forked projection 20 fixed to the support means 7a. A piston, not shown in the drawing, is slidably arranged in the cylinder 18 and connected to the piston rod 17 so that the position of the piston in the cylinder and therewith the inclination of the arm 16 with respect to the carriage 7a may be adjusted by furnishing pressure fluid to either side of the piston in a well known manner. The elements 16a, 17, 18, 18a, 19 and 20 together with the unillustrated piston and the unillustrated means for providing pressure fluid in the cylinder form therefore means to change the inclination of the arm 16 relative to the support so that the vertical distance between the outermost portions of the rolls 14 and 14a may be adjusted without changing the gap between the rolls. The upper roll 14 is mounted on the arm 16 in such a way that a gap 21 is maintained between the rolls.

Figure 9:
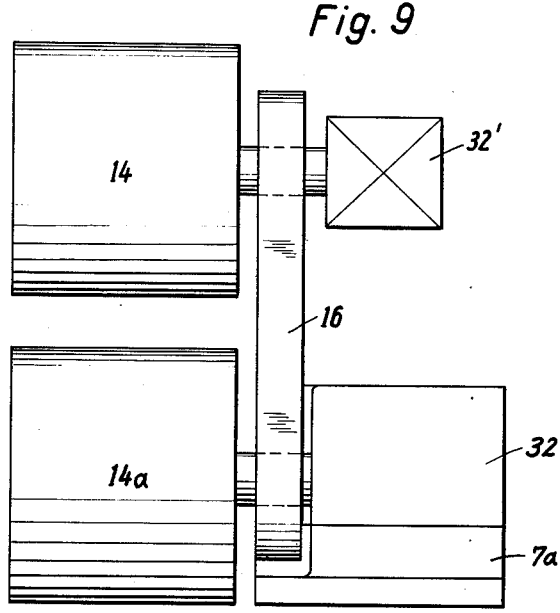
Fig. 9 is a schematic side view of part of the machine showing drive means for the rolls thereof.

The rolls 14 and 14a are respectively driven in opposite directions as indicated by the arrows A, B by turning means. Separate electric motors 32, 32' respectively connected to the shafts of the rolls 14 and 14a and respectively mounted on the machine body 7a and the arm 16 may be provided as schematically indicated in Fig. 9 for turning the rolls in the indicated directions, or the rolls may be driven over a chain drive from a single machine mounted on the support means 7a. In the latter case sprocket wheels would have to be mounted on the shafts of the rolls 14 and 14a and the sprocket chain would be mounted over the sprocket wheels in such a way so as to drive the rolls 14 and 14a in the indicated direction. It is of course also possible to drive only the lower roll 14a directly from a motor mounted on the support 7a and to drive the upper roll 14 over a gear train including a gear fixedly connected to the shaft of the lower roll 14a, a pair of idle gears and a gear fixed to the shaft of the upper roll 14.

When the two rolls 14 and 14a are driven in the direction indicated, the upper roll 14 will cut loose lumps of the mineral to be mined from the roof 13 of the seam, whereas the lower roll 14a will cut the material from the floor 12 of the seam. The cut lumps will be passed, during rotation of the two rolls in the indicated direction, through the gap 21 to be broken or crushed therein into smaller pieces. The maximum size of these pieces will depend on the width of the gap.

Figure 8B:
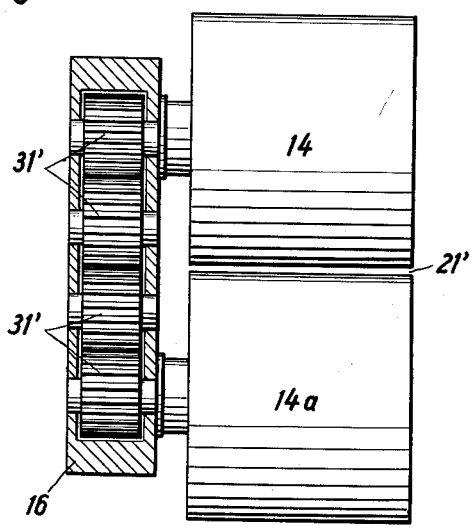
Figs. 8b and 8c are respectively a partially sectioned front view and a side view similar to Figs. 8 and 8a and showing the rolls of the machine in another adjusted position.
Figure 8C:
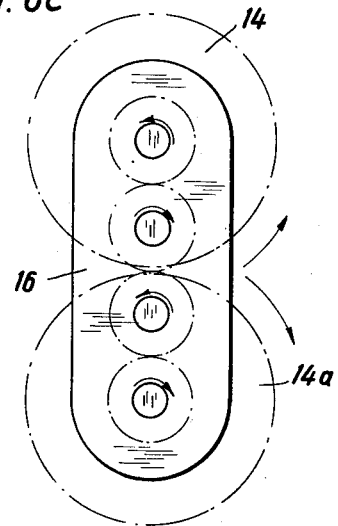
Figure 10:
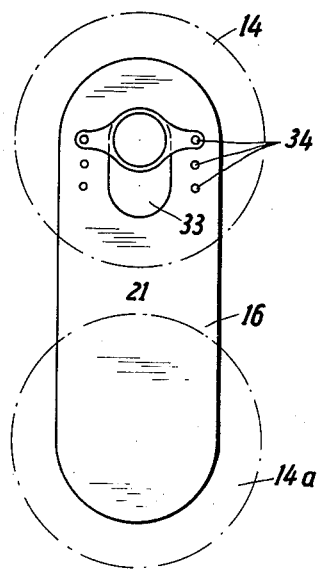
Fig. 10 is a schematic front view of a part of the machine showing means for holding the upper roll in adjusted position.

To provide for a machine in which the maximum size of the crushed mineral pieces can be adjusted it is preferred to make the distance between the rolls 14 and 14a adjustable. For this purpose the arm 16 may be provided with a longitudinal slot 33 as shown in Figs. 10 and 11 in which a bearing block for the upper roll 14 may be slidably arranged. The bearing block may then be shifted in the desired direction to adjust the width of the gap 21 and after the bearing block is shifted into the desired position it may be fixed in the slot by screw means 34 mounted on the arm 16 and engaging the outer surface of the bearing block. Hydraulic means, in the form of hydraulic cylinders and pistons 35, and connected to the arm 16 and the bearing block of the roll 14, as schematically shown in Fig. 11 may also be used for shifting the upper roll 14. The specific means for adjusting the distance between the axes of the rolls 14 and 14a do not form part of the present invention and such means are well known in the art and commonly used in rolling mills in which the distance between the uper and lower roll of the mill has to be adjusted. If the two rolls are driven by a chain drive, an additional tension roll has to be provided which will keep the chain tight in all adjusted positions of the upper roll. If the upper roll is driven over idle gears, as mentioned before, the gears 31, that is the idle gears, and the gears mounted on the shafts of the upper and lower rolls, are preferably made exchangeable so that these gears may be exchanged to gears 31' of smaller diameter whenever it is desired to change the gap 21 between the upper roll 14 and the lower roll 14a as shown in Fig. 8 to the smaller gap 21' as shown in Fig. 8b. It is understood that in this case the bearing block for the upper roll 14, not shown in the drawing, has to be mounted in the arm 16 for sliding movement in the longitudinal direction thereof, as for instance, schematically shown in Fig. 10. It is further understood that the arm 16 has also to be provided with the necessary bearing blocks for the idle gears which bearing blocks have to be adjustable so that idle gears of different diameters may be mounted on the arm 16 in proper engagement with the gears respectively fixed to the shafts of the rolls 14 and 14a.

The broken coal pieces ejected through the gap 21 during the operation of the machine are received by receiving means or a funnel 10, the right end of which, as seen in Fig. 2, is formed to follow closely the contours of the upper and lower rolls. The funnel 10 is preferably removably connected to the body 7a of the machine in any well known manner so as to move together with the machine during the forward movement thereof. Transporting means in form of a suction conduit 9 are connected to the rear end of the funnel 10. The general arrangement of the transporting means is shown in Figs. 4 and 5. The suction conduit 9 is arranged parallel to the side wall of the seam 2 to be mined and leads to cross tunnel 22 from which the mining tunnel 1 is branched off. A cyclone separator 25 is mounted on a movable support 24 in the cross tunnel 22 and the suction conduit 9 is connected to the cyclone separator 25 by means which will be described later on in further detail. The portion of the conduit 9 extending beyond the cyclone separator 25 is mounted in the tunnel 22 in such a manner that the conduit may easily be pulled into the tunnel 1 as the machine 7 advances during the mining operation into this tunnel. As can be clearly seen from Fig. 5 the funnel-shaped discharge end 25a of the cyclone separator 25 is arranged above a band conveyor 23 adapted to transport the coal pieces discharged from the separator 25 to any desired location. The cyclone separator 25 is connected by means of a suction tube 26 to a suction station not illustrated in the drawing.

A connecting socket 27 connects the suction conduit 9 with the cyclone 25 in which a partial vacuum is maintained, to convey the crushed coal from the suction tube to the cyclone separator 25, so that the coal may then be transferred from the cyclone separator to the transport conveyor 23. As shown in Figs. 6 and 7 the connecting socket 27 is inserted into the suction conduit 9, longitudinally slitted at 28 for this purpose, in such a way that the suction conduit 9 can be pulled during the advance of the machine 7 over the connecting socket 27 and so that the coal pieces may be transferred from the suction conduit 9 through the connecting socket 27 into the cyclone separator 25 substantially without loss of vacuum in the latter. To avoid a loss of vacuum through the slit 28 in the suction conduit 9 an elongated flexible cover 29 is provided extending over the slit 28 in the suction conduit 9. This flexible cover 29 is fixed at one side of the slit to the outer surface of the conduit 9 and engages with the unattached portion thereof loosely the outer surface of the conduit. The vacuum in the suction conduit 9 keeps the cover 29 tightly over the slit 28 therein and this cover is pushed aside only in the region of the connecting socket 27 so that the suction conduit remains tightly closed substantially over the whole length thereof. The suction conduit 9 is formed of flexible material which is stiff enough so as to maintain the tubular shape and it may be formed for instance by wire reinforced rubber. The connecting socket 27 will spread the slit 28 so that the material in the suction tube 9 may be transferred through the connecting socket 27 to the cyclone separator 25. From the cyclone separator 25 the material is transferred through a cell wheel 30 onto the band conveyor 23. The cell wheel 30 is formed in a well known manner to discharge the crushed coal from the separator 25 without substantially any loss of vacuum.

The machine just described will operate as follows: During the forward movement of the machine coal will be mined on the seam 2 in a width according to the length of the two rolls 14 and 14a. The position of upper roll 14 is adjusted by means of the cylinder and piston arrangement described in such a way that the upper roll will work on the roof 13 of the seam, whereas the lower roll 14a will work on the floor 12 of the seam. Due to the tiltable arrangement of the arm 16 of the position of the upper roll 14 may always be adjusted depending on the height of the seam to be mined, so that even if the height of the seam changes considerably, the whole cross section of the seam may be worked at any given time. The material cut loose by the two rolls is then passed through the gap 21 provided between the rolls so that any big lumps of material cut loose by the rolls will be crushed to small pieces of a desired maximum size. The distance between the two roll axes may be adjusted to obtain in this way crushed pieces of any desired maximum size.

The adjusted width of the gap 21 will remain the same during the tilting of the arm 16 so that the maximum grain size obtained from the machine will remain the same for any setting of the gap. Preferably the gap size is adjusted to a distance of less than 80 mm., since crushed pieces of this size can be easily transported by suction and since coal pieces of this size are easily marketable. As the machine 7 advances into the tunnel 1 the prop frames 4 are successively advanced in the same direction so as to properly support the roof 13 of the seam. This work is facilitated by the even top and bottom surfaces cut by the two rolls.

The crushed coal in the suction conduit 9 forms a column which can be easily transported similar to a piston in a cylnider by suction. In the cyclone separator 25 the crushed coal with an average grain size from 80 to 0.2 mm. is transferred through the cell wheel 30 onto the band conveyor 23 and the dust laden air is sucked through the conduit 26 to an additional dust separator from which the cleaned air is discharged into the open.

In the just described operation the mining is performed only during the forward movement of the machine, that is, during the movement thereof towards the right as viewed in Figs. 1 and 4. If the seam 2 to be mined is wider than the length of the rolls 14 and 14a, then the machine is returned to its starting position in the cross tunnel 22. Before returning the machine, the funnel 10 and the suction conduit 9 are detached and pulled back into the cross tunnel 22. Then the machine 7 and the supporting frame 24 of the cyclone separator 25 are moved laterally in the direction of the arrow shown in Fig. 4, the funnel 10 and the suction conduit 9 are again attached to the machine 7 and the above described operation is repeated.

It is possible to modify the machine 7 illustrated in the drawings slightly so that the machine can be used for mining during the forward movement thereof into the tunnel 1, as well as during the return movement of the machine. For this purpose it is preferred to mount the rolls 14 and 14a not as shown in Figs. 2 and 3 at the rear end of the machine frame 7a, but in the center region thereof, as schematically shown in Figs. 12 and 13. The means 16a, 17, 18, 18a, 19 and 20 for changing the inclination of the mounting arm 16 are preferably modified in this case in such a manner that the position of the axis of the upper roll 14 may be changed from a position in which this axis is located on one side of a vertical plane through the axis of the lower roll as shown in Figure 13 to a position in which the axis of the upper roll is located at the other side of this plane as shown in Figure 13a, so that regardless in which direction the machine is moved the upper roll will always trail behind the lower roll in direction of machine movement. This may simply be accomplished by providing a piston rod 17' slightly longer than shown in Fig. 2 and by mounting the cylinder 18 at proper distance from the arm 16. The arrangement of the suction conduit 9 is also preferably changed so that the suction conduit is not pulled by the machine 7, but arranged stationary extending parallel to the path of the machine 7 as schematically shown in Fig. 14. In this case the slides 11 may be formed with a longitudinal gap therebetween so that the suction conduit can be placed along the longitudinal center line of the machine or the conduit 9 may be placed alongside the machine 7. In this case it is possible to connect the conduit 9 without the use of a connecting socket directly to the cyclone separator 25, and to provide the funnel 10 with a connection socket 27' similar to the connection socket 27 which will serve to open the slit 28 in the suction conduit 9 and to transfer the crushed coal pieces from the funnel 10 into the conduit. After the machine 7 has reached during the forward movement the desired end position, the arm 16 is tilted so that the upper roll will have the proper position relative to the lower roll during the return passage of the machine, that is to a position in which the upper roll will again trail the lower roll during the return movement of the machine. The funnel 10 with its connecting socket is then removed from the machine and replaced by a different funnel and connecting socket which is inserted into the suction conduit 9 at the proper angle to facilitate a proper transfer of the mined coal into the conduit during the return movement of the machine. During this return movement the suction conduit is laterally moved in the direction toward the seam 2 and guide brackets or guide means 38 schematically shown in Fig. 14, connected to the machine body 7a or to the slides 11 are provided for this purpose.

It will be understood that each of the elements described above, or two or more together, may also find a useful application in other types of mining machines differing from the types described above.

While the invention has been illustrated and described as embodied in a mining machine for cutting minerals from a seam and for crushing at the same time the cut lumps into small pieces, it is not intended to be limited to the details shown, since various modifications and structural changes may be made without departing in any way from the spirit of the present invention.

What is claimed as new and desired to be secured by Letters Patent is:

1. Mining machine for mining coal or the like comprising, in combination, support means; moving means for moving said support means in at least one direction; a pair of combined cutting and breaking rolls mounted on said support means turnably about substantially parallel axes spaced from each other a distance greater than the sum of the radii of said rolls so that a gap is formed between said rolls, said combined cutting and breaking rolls being adapted to engage opposite faces of a seam to be mined, whereby during turning of said rolls coal lumps detached from the faces will be passed through said gap so as to be broken into pieces of a maximum size according to the width of said gap; turning means for turning said rolls in opposite directions; and elongated suction means having a receiving end adjacent said gap for sucking the broken coal pieces out of said gap and for transporting the broken coal away from said mining machine.

2. Mining machine for mining coal or the like comprising, in combination, support means; moving means for moving said support means in at least one direction; a pair of combined cutting and breaking rolls mounted on said support means turnably about substantially parallel axes spaced from each other a distance greater than the sum of the radii of said rolls so that a gap is formed between said rolls, said combined cutting and breaking rolls being adapted to engage opposite faces of a seam to be mined, whereby during turning of said rolls coal lumps detached from the faces will be passed through said gap so as to be broken into pieces of a maximum size according to the width of said gap; turning means for turning said rolls in opposite directions; adjusting means for adjusting the distance between the shaft axes to vary the width of the gap formed between said rolls; and elongated suction means having a receiving end adjacent said gap for sucking the broken coal pieces out of said gap and for transporting the broken coal away from said mining machine.

3. Mining machine for mining coal or the like comprising, in combination, support means; moving means for moving said support means in at least one direction; a pair of combined cutting and breaking rolls turnable about substantially parallel, horizontal axes spaced from each other a distance greater than the sum of the radii of said rolls so that a gap is formed between said rolls, one of said rolls being mounted on said support means; arm means mounted adjacent one end thereof on said support means tiltable about the axis of said one roll and carrying at the other end thereof the other of said rolls turnable about its axis; means operatively connected to said support means and to the other end of said arm means for changing the inclination of said arm means relative to said support means so that the vertical distance between the outermost portions of said rolls may be adjusted without changing the gap between said rolls, said combined cutting and breaking rolls being adapted to engage opposite faces of a seam to be mined, whereby during turning of said rolls coal lumps detached from the faces will be passed through said gap so as to be broken into pieces of maximum size according to the width of said gap; turning means for turning said rolls in opposite directions; funnel means mounted on said support means adjacent said gap for receiving the broken coal pieces; and suction conduit means fluid tightly connected to said funnel means for sucking the broken coal pieces through the funnel out of said gap and for transporting the broken coal away from said mining machine.

4. Mining machine for mining coal and the like comprising, in combination, elongated support means; moving means for moving said support means in one direction during a first part of the mining operation and in opposite direction during a second part thereof; a pair of combined cutting and breaking rolls turnable about substantially parallel, horizontal axes spaced from each other a distance greater than the sum of the radii of said rolls, one of said rolls being mounted on said support means in the central region thereof extending laterally therefrom; mounting means carried by said support means for mounting the other of said rolls above said one roll and tiltable about the axis of said one roll so that the vertical distance between the outermost portions of said roll may be adjusted without changing the gap between said rolls; turning means for turning said rolls in opposite directions; means for changing the inclination of said mounting means relative to said support means so that the position of the axis of the upper roll may be changed from a position in which said axis is located on one side of a vertical plane through the axis of the lower roll to a position in which the axis of the upper roll is located at the other side of said plane; elongated suction means extending in the direction of movement of said support means adjacent thereto; and receiving means removably mounted on said support means and having a receiving end adjacent said gap between said rolls for receiving the broken coal pieces and a discharge end fluid tightly connected to said elongated suction means for transferring the broken coal pieces to said elongated suction means.

5. Mining machine for mining coal and the like comprising, in combination, elongated support means; moving means for moving said support means in one direction during a first part of the mining operation and in opposite direction during a second part thereof; a pair of combined cutting and breaking rolls turnable about substantially parallel, horizontal axes spaced from each other a distance greater than the sum of the radii of said rolls, one of said rolls being mounted on said support means in the central region thereof extending laterally therefrom; mounting means carried by said support means for mounting the other of said rolls above said one roll and tiltable about the axis of said one roll so that the vertical distance between the outermost portions of said roll may be adjusted without changing the gap between said rolls; turning means for turning said rolls in opposite directions; means for changing the inclination of said mounting means relative to said support means so that the position of the axis of the upper roll may be changed from a position in which said axis is located on one side of a vertical plane through the axis of the lower roll to a position in which the axis of the upper roll is located at the other side of said plane; funnel means removably mounted on said support means adjacent said gap for receiving the broken coal pieces; suction conduit means extending in the direction of movement of said support means adjacent thereto and being formed with a longitudinal slot; and elongated flexible cover means extending over said slot and being fastened at one side thereof to said suction conduit means, said cover means being held by suction against said suction conduit means, and said funnel means having an end distant from said gap extending through said slot in said suction pipe means, a portion of said cover means being pushed aside by said end of said funnel means so that the broken coal pieces may be transferred from said funnel means into said suction pipe means during movement of said funnel means together with said support means.

6. Cutting machine as defined in claim 5 and including guide means associated with said support means for maintaining the suction conduit means adjacent to the support means during the movement of the machine.

References Cited in the file of this patent

UNITED STATES PATENTS

| | | |
|---|---|---|
| 1,148,975 | Kuhn et al. | Aug. 3, 1915 |
| 2,592,996 | Anderson | Apr. 15, 1952 |
| 2,606,010 | Howard | Aug. 5, 1952 |
| 2,767,970 | Paul | Oct. 23, 1956 |

FOREIGN PATENTS

| | | |
|---|---|---|
| 1,039,292 | France | May 13, 1953 |
| 688,227 | Great Britain | Mar. 4, 1953 |